Aug. 11, 1942.  E. J. BLACK  2,292,505
TREE HOLDER
Filed Oct. 24, 1940
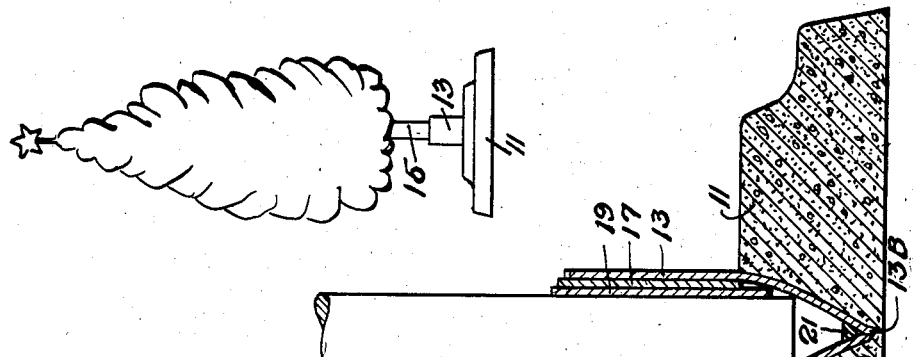
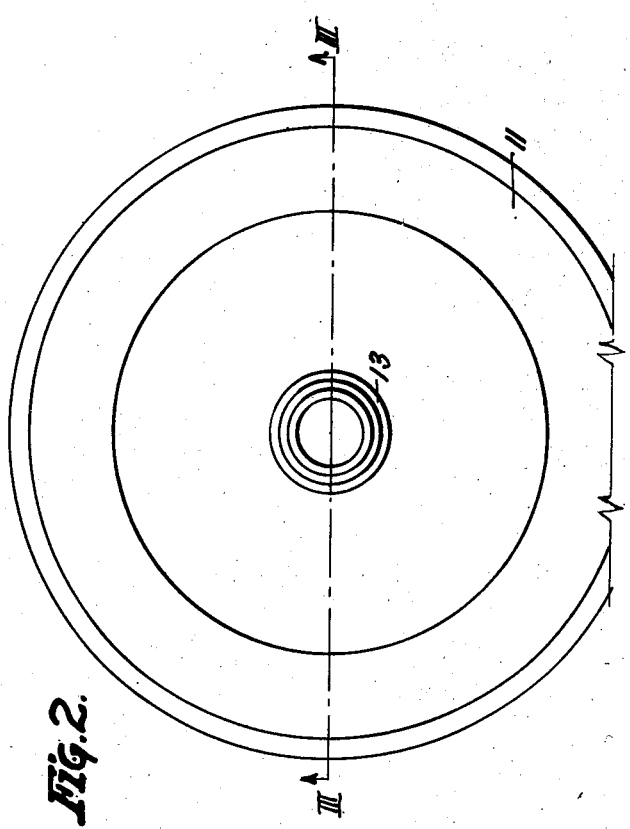
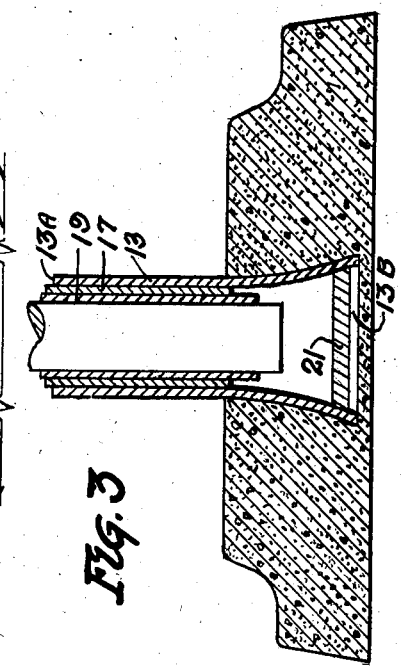
INVENTOR
ELBA J. BLACK
By J. H. Weatherford
Atty.

Patented Aug. 11, 1942

2,292,505

UNITED STATES PATENT OFFICE 2,292,505

TREE HOLDER

Elba J. Black, Memphis, Tenn.

Application October 24, 1940, Serial No. 362,516

3 Claims. (Cl. 248—44)

This invention relates to improvements in holders for small trees, such as Christmas trees, or for flags or the like.

The objects of the invention are to make a holder which is simple in construction, inexpensive and adapted, largely by its weight, to resist overturning.

The primary object of the invention is to provide a holder having a socket portion adapted to receive the stem of a tree or a like substantially cylindrical member and to provide means for supporting this socket in a rigid manner.

Further objects are to provide a holder having a socket portion and a base portion integrally united by constructing the base portion, the socket portion being so interlocked to the base as to substantially prevent its displacement; and the socket so constructed as to engage with the lower end of the tree or flag staff.

The means by which the foregoing and other objects are accomplished and the method of their accomplishment will readily be understood from the following specification upon reference to the accompanying drawing, in which:

Fig. 1 is a sketch showing the holder supporting a small tree, such as a Christmas tree.

Fig. 2 is a plan view of the device.

Fig. 3 is a sectional elevation taken as on the line III—III of Fig. 2; and

Fig. 4 a similar sectional elevation taken at right angles to the line III—III.

Referring now to the drawing in which the various parts are indicated by numerals:

11 is a base supporting a socket 13 into which the stem 15, as of a tree, is inserted. The socket 13 comprises a tubular member, such as a section of pipe, having its upper end 13—A cut squarely off to leave a fully open socket end and its lower end 13—B flattened to form wedge shaped surfaces adapted to engage and grip the end of a tree trunk or flag staff, and to bring the opposite side edges of the sleeve end together along a substantially straight line and laterally spread the transverse side edges; the flattening of the tube forming a substantial closure of the lower end.

The base 11 is formed by casting concrete around the lower end of the socket 13, the socket being positioned at right angles to the base and the lateral flare of the flattened edge of the socket 13—B anchoring the socket into the base against dislodgment. The base 11 is preferably made of circular conformation and may be of stepped or other ornamental configuration.

To adjust the socket to varying sizes of tree stems, sleeves 17 and 19 are provided, the sleeve 17 being adapted to nest within the socket and the sleeve 19 to nest within the sleeve 17, these sleeves having their upper ends cut off at right angles and their lower ends preferably similarly so cut off and being adapted to slip into the socket 13 until their lower edges seat on the wedge shaped lower portion of the socket accomplished by flattening the lower end thereof, the sleeves being adapted to be detachably secured in the socket by lightly driving them down.

The base 11 forms a weighted member adapted to resist overturning of the tree supported thereby. Preferably the lower end of the socket 13 terminates slightly above the bottom of the base so that the base material forms an additional closure and seal for the lower end of the socket. If desired a small amount 21 of plastic material such as tar may be placed in the lower end of the socket to complete a substantially hermetical seal, this material being heated and poured into the socket either before the socket is placed and cast into the concrete or thereafter as may appear desirable.

Having described my invention, I claim:

1. A portable holder as for a Christmas tree, or the like; comprising an annular base and an integrally united tubular socket for tree reception, said base being of inherently heavy material to provide stabilizing weight, and relatively thin as related to its lateral spread, to promote maximum stability for the weight used, said socket being relatively much elongated with respect to the base thickness whereby to project thereabove and provide a stable socket receptacle for said tree, the lower end of said socket for substantially the thickness of said base being flattened convergingly downward from two diametrically opposite sides, to accomplish a downwardly faced wedge shaped portion, adapted to wedgingly engage the lower end of said tree stem on downward thrust thereof and to spread said socket along said flattening and accomplish a downwardly spreading anchor portion, said socket lower end being integrally imbedded in said base.

2. A portable holder as for a Christmas tree, or the like; comprising an annular base and an integrally united tubular socket for tree reception, said base being of concrete to provide stabilizing weight, and relatively thin as related to its lateral spread, to promote maximum stability for the weight used, and moldable to effect its shaping and engagement with said socket; said socket being relatively much elongated with respect to the base thickness whereby to project thereabove and provide a stable socket receptacle for said tree, the lower end of said socket for substantially the thickness of said base being flattened convergingly downward from two diametrically opposite sides, to accomplish a downwardly faced wedge shaped portion, adapted to wedgingly engage the lower end of said tree stem on downward thrust thereof and to spread said socket along said flattening and accomplish a downwardly spreading anchor portion, said socket lower end being integrally imbedded in said base during formation of said base.

3. A portable holder as for a Christmas tree or the like; comprising an annular base, an integrally united socket for tree reception, and a plurality of sleeves of decreasing sizes, serially nestable in said socket and each other for selectively conforming said socket size to tree trunk size said base being of inherently heavy material to provide stabilizing weight, and relatively thin as related to its lateral spread, to promote maximum stability for the weight used, said socket being relatively much elongated with respect to the base thickness whereby to project thereabove and provide a stable socket receptacle for said tree, the lower end of said socket for substantially the thickness of said base being flattened convergingly downward from two diametrically opposite sides, to accomplish a downwardly faced wedge shaped portion, adapted to wedgingly engage the lower end of said tree stem on downward thrust thereof and to spread said socket along said flattening and accomplish a downwardly spreading anchor portion, said socket lower end being integrally imbedded in said base.

ELBA J. BLACK.